United States Patent
Paspirgilis

(10) Patent No.: US 8,079,185 B2
(45) Date of Patent: Dec. 20, 2011

(54) WINDOW ELEMENT FOR INSERTION IN A WINDOW APERTURE IN AN OUTER SKIN OF A TRANSPORT

(75) Inventor: Bernd Paspirgilis, Steinbergkirche (DE)

(73) Assignee: Airbus Deutschland GmbH, Hamburg (DE)

( * ) Notice: Subject to any disclaimer, the term of this patent is extended or adjusted under 35 U.S.C. 154(b) by 1134 days.

(21) Appl. No.: 11/251,054

(22) Filed: Oct. 14, 2005

(65) Prior Publication Data

US 2006/0123718 A1     Jun. 15, 2006

(30) Foreign Application Priority Data

Oct. 15, 2004    (DE) .......................... 10 2004 050 399

(51) Int. Cl.
  *E06B 3/964*    (2006.01)
(52) U.S. Cl. .................... 52/204.62; 52/204.71; 52/209; 52/788.1; 244/129.3; 454/212
(58) Field of Classification Search .................... 52/208, 52/786.12, 204.71, 788.1, 204.1, 204.52, 52/204.62, 204.64, 204.65, 204.7, 209; 244/129.3, 244/121; 114/117; 296/146.15, 208; 428/31; 454/70–76, 196, 212
See application file for complete search history.

(56) References Cited

U.S. PATENT DOCUMENTS

| 2,409,808 | A | * | 10/1946 | Sowle | 52/309.3 |
| 2,602,970 | A | * | 7/1952 | Gouge | 52/1 |
| 3,382,630 | A | * | 5/1968 | Chivers | 52/208 |
| 4,030,258 | A | * | 6/1977 | Anders | 52/208 |
| 4,204,374 | A | * | 5/1980 | Olson | 52/208 |
| 4,541,595 | A | * | 9/1985 | Fiala et al. | 244/129.3 |
| 5,467,943 | A | * | 11/1995 | Umeda | 244/129.3 |
| 5,475,956 | A | * | 12/1995 | Agrawal et al. | 52/208 |
| 5,635,281 | A | * | 6/1997 | Agrawal | 428/192 |
| 5,884,865 | A | * | 3/1999 | Scherer et al. | 244/129.3 |
| 5,980,174 | A | * | 11/1999 | Gallagher et al. | 411/55 |
| 5,988,566 | A | * | 11/1999 | Meyer | 244/129.3 |
| 6,086,138 | A | * | 7/2000 | Xu et al. | 296/146.15 |
| 6,089,646 | A | * | 7/2000 | Xu et al. | 296/146.15 |
| 7,028,950 | B2 | * | 4/2006 | Salmon et al. | 244/129.3 |
| 2003/0062450 | A1 | * | 4/2003 | Dazet et al. | 244/129.3 |
| 2003/0234322 | A1 | * | 12/2003 | Bladt et al. | 244/129.3 |

FOREIGN PATENT DOCUMENTS

DE        4408476 A1    9/1995

(Continued)

*Primary Examiner* — Basil Katcheves
*Assistant Examiner* — Theodore Adamos
(74) *Attorney, Agent, or Firm* — Christopher Paradies; Fowler White Boggs P.A.

(57) ABSTRACT

A window element has a cover pane which is substantially flush with an outer skin of an aircraft or other transport, achieving a fluid-dynamically favorable, substantially unbulged exterior surface. As a result of the presence of an additional back-ventilated cover pane arranged in front of the actual outer pane of the window element, a fluid-dynamically favorable integration of the window element into the outer skin of an aircraft fuselage airframe is achieved. Any deformation, such as any buckling or bulging of the outer pane of the window element, as a result of a difference in pressure between the interior of the aircraft fuselage airframe and the exterior space at cruising altitudes, has no fluid-dynamically disadvantageous effect. The outer pane is covered by the cover pane which remains substantially undeformed with respect to the outer skin of the aircraft fuselage airframe, for example. Any deformation of the cover pane is largely eliminated by back-ventilation.

16 Claims, 5 Drawing Sheets

FOREIGN PATENT DOCUMENTS

| | | |
|---|---|---|
| EP | 0064583 A1 | 11/1982 |
| EP | 0936139 A2 | 8/1999 |
| EP | 1342553 A1 | 9/2003 |
| GB | 842657 | 7/1960 |
| GB | 2289649 A | 11/1995 |
| WO | 2004011249 A1 | 2/2004 |

\* cited by examiner

WINDOW ELEMENT FOR INSERTION IN A WINDOW APERTURE IN AN OUTER SKIN OF A TRANSPORT

RELATED APPLICATION

This application claims the benefit of the filing date of German Patent Application No. 10 2004 050 399.0 filed Oct. 15, 2004, the disclosure of which is hereby incorporated herein by reference.

FIELD OF THE INVENTION

The field is structural engineering in the transportation industry, specifically aircraft windows.

TECHNOLOGICAL BACKGROUND

Numerous variations of window elements for insertion in fuselage airframes of aircraft are known from reference in the field. Some of these window elements have a forged window frame made of aluminium which forms the actual supporting structure of the window element. A window frame with a T-shaped cross-sectional geometry is known; however, such a window is known to bulge or deform as the pressure difference changes during ascent to cruising altitude. This deformation increases drag and is aerodynamically disadvantageous.

A conventional window frame has a circumferential fixing flange with a circumferential recess. The window frame is firmly joined to the inside of the fuselage airframe in the area of the recess in an edge area of the window aperture. The joining can be made, for example, by riveting, gluing, welding or the like. A mechanical reinforcement of the window aperture inside the fuselage airframe can be achieved.

The window frame further fixes a pressing frame by means of a plurality of fixing elements, which are distributed preferably uniformly over the circumference of the window frame, for example, in the form of eye bolts. The eye bolts are fixed with their fixing eyes on a circumferential cross-piece or web of the window frame, and are arranged approximately perpendicularly to the fixing flange, are riveted, for example. The eye bolts each have threaded sections for receiving screwed nuts at their ends pointing away from the fixing eyes. The threaded sections of the eye bolts are guidable through corresponding openings in the pressing frame.

In addition, the window frame has an inwardly directed, conical bearing surface for positioning a window package formed of an inner pane and an outer pane. The inner pane and the outer pane are in this case bordered by a circumferential window seal, which is pressed onto the conical bearing surface by means of the pressing frame. The window package with the window seal is positioned on the bearing surface of the window frame from the interior of the fuselage airframe and is centred and fixed by means of the pressing frame. By tightening the screw nuts on the threaded sections of the eye bolts, the pressing frame, the window package and the window frame are firmly clamped or biased with respect to one another.

In such window elements, the window frame has many functions. First, the window frame reinforces the window aperture in the fuselage airframe. In addition, the window frame ensures the pressure-tight abutment and centering of the window package and the window seal. Furthermore, the window package is secured against falling out and/or pushing out. Finally, the window frame forms an externally visible edge which ensure the most favorable possible aerodynamic transitions from the outer skin of the fuselage airframe to the outer window of the window package.

The window elements comprising window frames, that are currently used, have very complex constructions as a result of the numerous requirements described hereinbefore. As a result of the high mechanical stressing, these window frames must be forged from aluminium and then machine processed, where the precision requirements are very high. As a consequence of the required expensive construction of the window frames, the plurality of additional connecting elements and the supporting frame, the weight of the known window elements is very high.

In addition, assembly of the described window elements is expensive. First, it is necessary to position the window frame exactly in the window aperture and then rivet to the fuselage airframe in the edge area of the window aperture. Then, up to six eye bolts must be individually riveted to the window frame. The window package is then inserted in the window frame where a second person must check the correct fit of the window package from outside and correct if necessary. The pressing frame is then threaded onto the eye bolts and screwed tightly to the window frame by means of screw nuts. In this case, the pressing frame presses elastically onto the window package and holds this in the pre-defined position inside the window frame.

In addition, aerodynamic adverse effects are frequently produced by using the currently used window elements in fuselage airframes of aircraft. These effects occur because is approximately flush in order to ensure that the outer pane of the window package with the outer skin of the fuselage airframe, the fixing flange of the window frame of the described window elements has a circumferential recess with a thickness approximately corresponding to the material thickness of the sheet metal usually used to form the outer skin.

However, the outer skin of aircraft fuselage airframes frequently has different material thicknesses in different sections of the fuselage. Thus, the outer panes of the window elements used are not always completely flush with the outer skin in all sections of the aircraft fuselage. Furthermore, the pressure difference at high flying altitudes produces a buckling or bulging of the outer pane which can be up to 4 millimeters over the outer strake. These described aerodynamic effects results in perturbations of the flow around the fuselage airframe which can considerably impair the aerodynamic quality of the outer skin of the fuselage airframe of an aircraft, especially if a large number of window elements is used in the fuselage airframe.

As a result of previously indicated disadvantages of the of window elements, often used currently these are only suitable to a limited extent for use in aircraft having large dimensions and a large number of window elements resulting therefrom.

SUMMARY OF THE INVENTION

A window element has a cover pane which is substantially flush with the outer skin in order to achieve a fluid dynamically favorable, largely flat shape of the outer skin. Thus, a highly aerodynamic outer skin is obtained, independently of any deformation of the outer pane of the window element due to the difference between the cabin internal pressure at cruising altitudes. In addition, the window element according to one embodiment of the invention, can be mounted simply, easily and rapidly into a window aperture in an aircraft fuselage airframe or fuselage cell. Further, some of the components required to form the window element according to one embodiment of the invention can be produced easily, due to manufacturing technology with the required high dimensional stability, for example, the use of fibre-reinforced plastics in injection moulding.

According to one embodiment, the window element comprises a window frame with an outer face. The outer face is joinable, at least in certain areas, to an inner face of the outer skin in an edge area of the window aperture. Such a feature may ensure easy mounting of the window frame in a window aperture of the aircraft outer skin.

According to one embodiment of the window frame, a supporting frame inside the window aperture rests on the outer face at least in certain areas. This embodiment may ensure that further add-on pieces of the window element can easily be mounted from the inside of the aircraft.

According to one embodiment of the invention, the cover pane rests on the supporting frame, is joined thereto at least in certain areas. This embodiment may provide a substantially flush termination of the outer skin of the aircraft with the outer face of the cover pane so that an aerodynamically favorable connection of the window element with the outer skin may be obtained.

According to one embodiment, a supporting-frame outer face has indentations, at least in certain areas, allowing ventilation. In this embodiment the ambient air pressure acts between the outer pane of the window element and the cover pane depending on the flying altitude of the aircraft. An aerodynamically disadvantageous buckling of the cover pane with increasing flying altitude of the aircraft that occurs when the outer pane is exposed to the full cabin internal pressure may be avoided, thus, a substantially flush, fluid-dynamically advantageous termination of the window element according to an embodiment of the invention with the outer skin of the aircraft may be obtained regardless of the prevailing external pressure conditions.

According to one embodiment, the supporting frame comprises at least one connecting element for connection to the window frame and a pressing frame. This embodiment provides a window frame firmly clampable to a pressing frame.

According to one embodiment, clamping or biasing force between the pressing frame and the window frame allows for a window-frame seal for receiving an inner pane and an outer pane by means of a connecting element or a connecting element. This embodiment has the advantage of providing an interior of the aircraft completely and reliably sealable with respect to the surrounding atmosphere.

According to one embodiment of the invention, a window element can be inserted in a window aperture in an outer skin of a means of transport, such as an aircraft. The window element may have a cover pane which is substantially flush with the outer skin in order to achieve a fluid-dynamically favorable, substantially smooth transition between the windows and the outer skin. By substantially smooth, it is meant that the cover pane does not bulge in a way that affects the fluid dynamic efficiency of the exterior.

As a result of the presence of an additional back-ventilated cover pane arranged in front of the actual outer pane of the window element, a fluid-dynamically favorable integration of the window element into the outer skin of an aircraft fuselage airframe may be achieved. Any deformation, such as buckling or outward bulging, of the outer pane of the window element, which may result from a pressure difference between the interior of the aircraft fuselage airframe and the exterior space at cruising altitudes has no fluid-dynamically disadvantageous effect. The outer pane may be covered by cover pane, which remains substantially flush with the outer skin of the aircraft fuselage airframe. Deformation of the cover pane is substantially eliminated by back-ventilation of the cover pane, which prevents pressure buildup, for example.

BRIEF DESCRIPTION OF THE DRAWINGS

The drawings provide illustrations of some examples.

DETAILED DESCRIPTION OF PREFERRED EMBODIMENTS

As a result of previously indicated disadvantages of the of window elements, often used currently these are only suitable to a limited extent for use in aircraft having large dimensions and a large number of window elements resulting therefrom.

Figure 1:
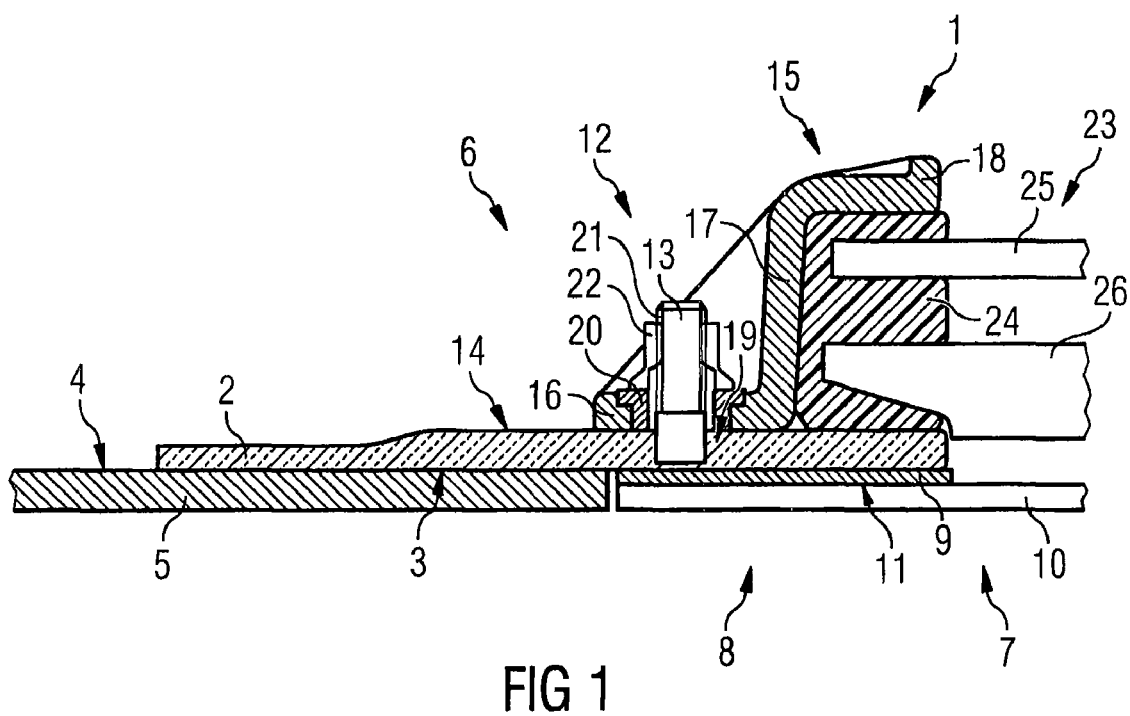
FIG. 1 shows a window element in a cross-sectional view.
Figure 2:
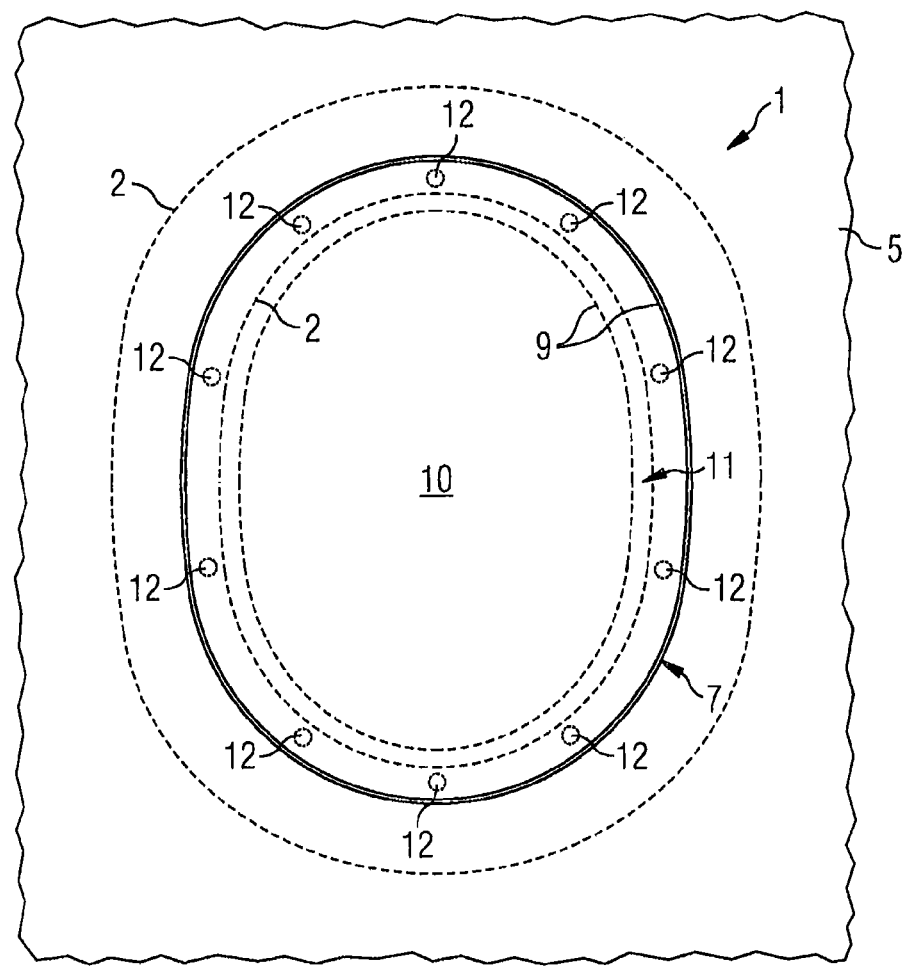
FIG. 2 shows an exterior view of a window element in an outer skin of an aircraft.

FIG. 1 illustrates a cross-section of a portion of a window element according to one embodiment of the invention. The window element 1 comprises a window frame 2 with a window-frame outer face 3. The window frame 2 has a substantially rectangular cross-sectional geometry. The window frame 2 according to the one embodiment of the invention based on known window elements for aircraft, substantially has an oval, circular, elliptical or angular or polygonal circumferential contour with optionally rounded edges, as illustrated in FIG. 2, for example.

In reference to FIG. 1, the window frame 2 rests with the window-frame outer face 3 partly on an outer-skin inner face 4 of an outer skin 5 in the edge area 6 of a window aperture 7 of an aircraft fuselage airframe. In this area, the window frame is glued, riveted or firmly joined in other ways to the outer-skin inner face 4 preferably over the entire area. For better clarity the aircraft and the fuselage airframe are not shown in detail in the diagram in FIG. 1. The window frame 2 may be formed from a polymeric material, such as fiber-reinforced plastic material.

Figure 4:
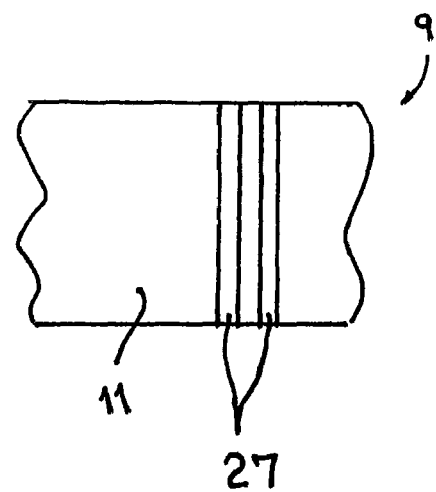
FIG. 4 illustrates, schematically, indentations in the outer face of a portion of the supporting frame.
Figure 5:
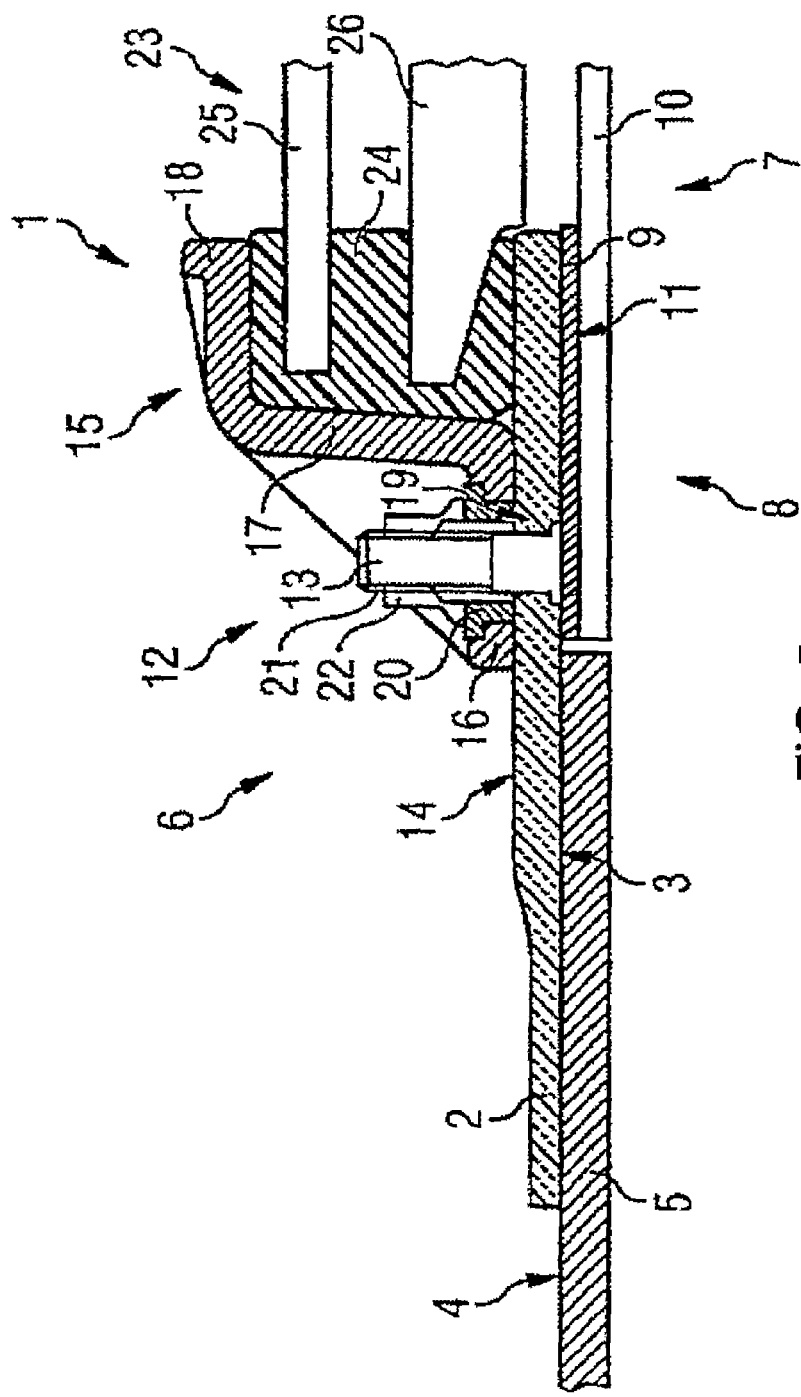
FIG. 5 shows a further cross-sectional view of a window element.

The window frame 2 relative to its width is only approximately half-joined to the edge area 6 of the window aperture 7, as far as the beginning of a bearing area 8. In the bearing area 8 of the window-frame outer face 3, a supporting frame 9 with a cover pane 10 rests on the window frame 2. On a supporting frame outer face 11, the supporting frame 9 has a plurality of continuous indentations running parallel to the cover pane 10, in the form of grooves, slits or channels, for example. The indentations make it possible to achieve pressure equalization between the region formed by the outer pane 26 and the cover pane 10 and the external environment of the aircraft. Alternatively, only one continuous indentation 27 in the form of a groove, a slit or a channel can be provided, with the indentation being incorporated in a labyrinth fashion in the supporting-frame outer face 11 on which the cover pane 10 is arranged. As a result of these indentations, no sealing effect with respect to air pressure fluctuations is provided between the supporting frame 9 and the cover pane 10, but a supporting-frame outer face may have indentations at least in certain areas to achieve back-ventilation of the cover pane, as illustrated schematically on a portion of the outer face 11 of the supporting frame 9 in FIG. 4. For example, the outer face 11 of a supporting frame may have a coating, painting, lamination or the like over the outer surface 11 of the supporting frame. The supporting frame 9 may be formed by a stamping, manufactured from a metal sheet, or by injection moulding of a fibre-reinforced plastic, for example, and the outer face 11 of the supporting frame 9 may be joined to a peripheral surface of a polycarbonate cover pane 10. The indentations in the outer face 11 achieves back ventilation through the indentations in the outer face 11 of the supporting frame 9 at the interface between the outer face 11 of the supporting frame 9 and the cover pane 10, when the supporting frame 9 is mounted to the window frame and the window frame is installed in the skin of a transport, such as an aircraft. The supporting frame may include connecting elements 12 located underneath the coating, lamination or painting of the supporting frame 9, such that the connecting elements 12 are not visible on the outer face 11 of the supporting frame 9.

In addition, the supporting frame 9 has a plurality of connecting elements 12. The connecting elements are preferably distributed over the circumference of the supporting frame 9 spaced uniformly with respect to one another (see FIG. 2). The connection element 12, as shown in FIG. 1 as representative of the others comprises, a stud bolt 13, which is welded, or riveted firmly to the supporting frame 9. The supporting frame 9 including the cover pane 10 has a material thickness which approximately corresponds to a material thickness of the outer skin 5 in the edge area 6 of the window aperture 7. Such features help achieve a substantially flush favorable connection with the outer skin 5 of the aircraft fuselage airframe. The supporting frame 9 may be formed with a metallic material. Alternatively, the supporting frame 9 may partially contain polymeric material, such as a fibre-reinforced plastic material. The supporting frame 9 may have a non-transparent coating, painting, lamination or the like on the supporting frame outer face 11 to achieve a visually appealing appearance amongst other things.

In the bearing area 8 of the window frame 2, a pressing frame 15 rests on the window frame 2 on a window-frame inner face 14. The pressing frame 15 comprises, amongst other things, a lower leg 16, a cross-piece 17 or web and an upper leg 18. The cross-piece 17 joins the lower to the upper leg 16, 18 so that an approximately z-shaped cross-sectional geometry of the pressing frame 15 is obtained.

Formed in the lower leg 16, are a plurality of holes or bores in which inserts are place for reinforcement. The holes with the inserts are distributed uniformly spaced with respect to one another around the circumference of the pressing frame 15 so that the stud bolts 13 are guided there through free from stress. One hole 19 with an insert 20 as shown in FIG. 1 like the other holes, may have inserts distributed around the circumference of the pressing frame 15, which are not shown. At its upper end, the stud bolt 13 has a threaded section 21 onto which a threaded nut 22 can be attached. Instead of the connecting element 12 in the form of the stud bolt 13 with the threaded section 21, the insert 20 and the threaded nut 22, rivet connections, clamp connections, press connections or the like can also be employed. In one example, it is possible to join the supporting frame 9, the window frame 2 and the pressing frame 15 by gluing one to the other, preferably over the entire area, or other adhesive means.

The circumferential contour of the pressing frame 15 substantially follows the circumferential contour of the window frame 2. In one example, the width of the lower leg 16 of the pressing frame 15 is preferably smaller than the width of the window frame 2.

A window package 23 can be firmly clamped or biased between the bearing area 8 of the window frame 2 and the upper leg 18 of the pressing frame 15 by means of the pressing frame 15. In this case, the window package 23 comprises amongst other things a window frame seal 24 with an inner pane 25 and an outer pane 26. In this case, the inner pane 25 and the outer pane 26 are enclosed at the edge by the window frame seal 24. The inner pane 25 and the outer pane 26 have a circumferential contour which approximately follows the circumferential contour of the pressing frame 15, the window frame 2 and the window aperture 7 at a parallel spacing.

The window package 23 can be clamped firmly between the pressing frame 15 and the window frame 2 by tightening the threaded nut 22 on the threaded section 21 of the stud bolt 13. In this case, the pressing frame 15 takes over additional loading by screwing to the window frame 2. In addition, the pressing frame 15 receives the window package 23, centers this and fixes it in a predefined position. As a result of the coating, painting or lamination of the supporting frame 9, the edge of the window package 23 mounted from inside is not visible from outside so that the window package 23 need not be precisely aligned.

Both the inner pane 25 and the outer pane 26 are exposed to the full cabin internal pressure which approximately corresponds to the air pressure near the ground. However, in the fuselage air frame or the outer skins of the aircraft, the low ambient air pressure at higher flying altitudes prevails. This difference in pressure results in an appreciable mechanical loading of the outer pane 26, which causes considerable buckling. In certain cases, the magnitude of this pressure-induced buckling of the outer pane 26 can amount to several millimeters.

The cover pane 10 is arranged at a short distance in front of the outer pane 26 so that the outer pane 26 itself does not contact the cover pane 10 even under maximum bulging. This ensures a substantially flush and therefore fluid-dynamically favorable integration of the window element 1 in the outer skin 5 of the aircraft in any operating state, especially at any flying altitude. This occurs if the outer pane 26 is externally deformed as a result of a large difference between the cabin internal pressure and the ambient air pressure. As a result of the indentations located in the supporting frame 9, no pressure difference prevails in the area between the outer pane 26 and the cover pane 10 so that the cover pane 10 cannot become deformed. Many other variations and attachment mechanisms may be used, to mount a window with a non-deforming cover pane 10 or a cover 10 that deforms together with the exterior of the aircraft.

Now, referring to FIG. 2, the window frame 2 is arranged so that it is not visible behind the outer skin 5 and/or the supporting frame 9 inside the window aperture 7. A total of ten connecting elements 12 are located underneath the coating, lamination or painting of the supporting frame 9 and are not visible in the FIG. 2. The cover pane 10 is formed from a transparent polymeric material, such as polycarbonate or any other transparent material that had adequate strength, stiffness and attachability.

The transparent cover pane 10 almost fills the entire area of the window aperture 7 apart form a narrow joining area between an inner edge of the window aperture 7 and a circumferential edge of the cover pane 10. This results in a fluid-dynamically embodiment of the window element 1 being inserted in the outer skin 5 so it is substantially flush.

Figure 3:
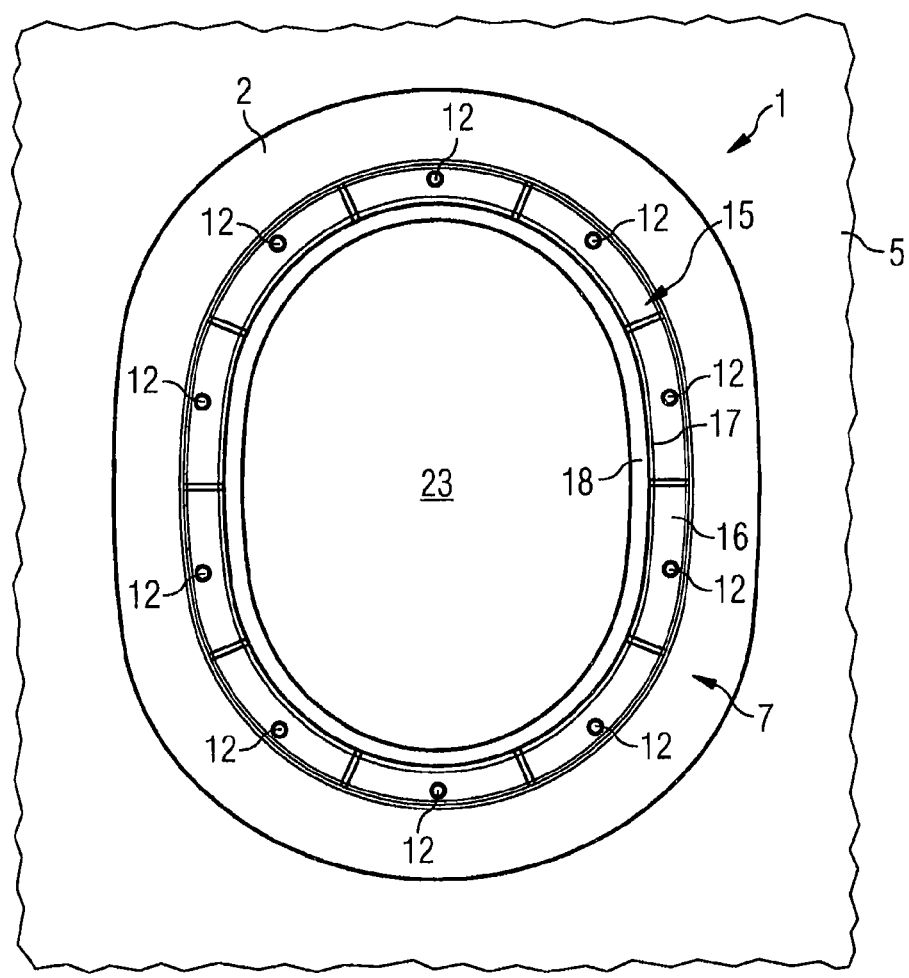
FIG. 3 shows an interior view of a window element inserted in an outer skin of an aircraft.

Now, referring to FIG. 3, the window frame 2 encompasses the window aperture 7 in the outer skin 5 of the aircraft. The pressing frame 15 is formed with a lower leg 16 for resting on the window frame 2, a cross-piece 17 arranged substantially perpendicularly on the lower leg 16 which approximately corresponds to a height of the window package 23, and an upper leg 18 pointing towards the center of the window aperture 7 for enclosing the window package 23. In one example, the pressing frame 15 is firmly clamped to the window frame 2, the supporting frame 9 and the window package 23 by means of the ten connecting elements 12.

Apart from the aerodynamically advantageous integration in the outer skin of an aircraft, the window element 1 may be produced simply, rapidly and precisely with regard to production technology. The window frame 2 may have a substantially rectangular cross-sectional geometry which can easily be manufactured such as, by injection moulding from fibre-reinforced polymeric materials.

The supporting frame 9 also may have a substantially rectangular cross-sectional geometry so that the frame can be easily be manufactured, such as by stamping from flat metal materials, including metal sheet or other materials, for example. The supporting frame 9 may be manufactured by injection moulding, from a fibre-reinforced polymeric material, for example. The cover pane 10 formed with polycarbonate, is glued, welded or firmly joined in another manner to the supporting frame outer face 11, preferably over the entire area. As a result of the indentations, such as grooves, channels, slits, for example, provided between the cover pane 10 and the supporting frame 9, pressure equalization can be achieved. Thus, no pressure build-up occurs to cause the cover pane 10 to bulge.

The pressing frame 15 with the lower leg 16, the cross-piece 17 and the upper leg 18 may have a z-shaped cross-sectional geometry, but the pressing frame 15 may equally be injection moulded from a fibre-reinforced polymeric material, for example. Therefore, manufacturing costs are reduced compared to known designs of window inserts.

The window element 1 according to one embodiment of the invention can also be mounted in a simple fashion in a window aperture 7 in a fuselage airframe of an aircraft. For assembly, the window frame 2 is inserted so that it fits in the window aperture 7 and then is joined in the edge area 6 to the outer skin 5, such as by gluing or riveting. The supporting frame 9 with the stud bolts 13 and the cover pane 10 may be placed on the bearing area 8 of the window frame 2 from the outside. In one example, the stud bolts 13 are inserted through corresponding holes in the window frame 2. The pressing frame 15 with the window package 23 enclosed therein can then be placed on or threaded onto the stud bolts 13 from inside. Finally, the threaded nuts are screwed onto the threaded sections of the stud bolts. The window frame 2 is firmly clamped or pressed to the pressing frame 15 containing the window package 23 and the supporting frame 9. Thus, alignment or centering of the window package 23 inside the window aperture 7 need not be precise, reducing installation costs by increasing tolerances for this process. It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS

1 Window element
2 Window frame
3 Outer face of window frame
4 Inner face of outer skin
5 Outer skin
6 Edge area
7 Window aperture
8 Bearing area
9 Supporting frame
10 Cover pane
11 Outer face of supporting frame
12 Connecting element
13 Stud bolt
14 Inner face of window frame
15 Pressing frame
16 Lower leg
17 Cross-piece
18 Upper leg
19 Hole
20 Insert
21 Threaded section
22 Threaded nut
23 Window package
24 Window frame seal
25 Inner pane
26 Outer pane
27 Indentation

What is claimed is:

1. A transport, comprising:
an outer skin having an inner surface, an outer surface and a window opening;
a sealed, double-pane window element having two window panes sealed together by a seal and mounted in a window frame, the window frame having a window-frame outer face facing away from an interior of the transport toward an exterior environment, the window-frame outer face having an outer peripheral portion being mounted to the inner surface of the outer skin; and
a cover pane having a peripheral portion of an inner surface of the cover pane ventilatingly coupled to an outer surface of a support frame, the window-frame outer face having an inner peripheral portion extending from the outer peripheral portion of the window-frame outer face and extending over a portion of the support frame and the peripheral portion of the inner surface of the cover pane, the support frame having an inner surface of the support frame coupled to the inner peripheral portion of the window-frame outer face such that the window-frame outer face extends across any gap between the outer skin and cover pane, and air pressure between the window element and the cover pane ventilatingly coupled to the outer surface of the support frame equalizes with an air pressure external to the transport, achieving back ventilation of the cover pane.

2. The transport of claim 1, wherein the cover pane is joined adhesively to at least a portion of the supporting frame.

3. The transport of claim 1, further comprising a pressing frame attached to the supporting frame wherein the supporting frame comprises at least one connecting element attachable to the window frame.

4. The transport of claim 3, wherein the seal is clampable between the pressing frame and the window frame such that the window frame seal receives an inner pane and an outer pane using at least one connecting element.

5. The transport of claim 3, wherein at least one connecting element includes a stud bolt and a threaded nut, the stud bolt being selected to fit in a hole in the window frame and the threaded nut engages threads on the stud bolt for joining the supporting frame and the window frame.

6. The transport of claim 5, wherein the pressing frame has at least one hole reinforced by a reinforcing element and the stud bolt fits through the at least one hole such that the pressing frame is joined to the supporting frame.

7. The transport of claim 5, wherein the at least one connecting element is at least six connecting elements space substantially uniformly with respect to one another in the supporting frame.

8. The transport of claim 3, wherein the pressing frame is of a fiber-reinforced plastic material.

9. The transport of claim 1, wherein the window frame has a substantially rectangular cross-sectional geometry.

10. The transport of claim 9, wherein the window frame is of a fiber-reinforced polymeric material, a metal or both a fiber-reinforced polymeric material and a metal.

11. The transport of claim 1, wherein the supporting frame has a substantially rectangular cross-sectional geometry.

12. The transport of claim 1, wherein the supporting frame is of a sheet metal, and the sheet metal is painted, coated or laminated.

13. The transport of claim 1, wherein the window-frame outer face is joined by gluing or riveting to at least a portion of the inner face of the outer skin.

14. The transport of claim 1, wherein the cover pane is attached to the supporting frame by gluing or riveting.

15. The transport of claim 1, wherein the cover pane is of a polymeric material.

16. The transport of claim 15, wherein the polymeric material is of a polycarbonate.

* * * * *